United States Patent [19]
Daily et al.

[11] Patent Number: 5,449,251
[45] Date of Patent: Sep. 12, 1995

[54] DYNAMIC UNDERGROUND STRIPPING: STEAM AND ELECTRIC HEATING FOR IN SITU DECONTAMINATION OF SOILS AND GROUNDWATER

[75] Inventors: William D. Daily, Livermore; Abelardo L. Ramirez; Robin L. Newmark, both of Pleasanton; Kent Udell, Berkeley; Harley M. Buetnner; Roger D. Aines, both of Livermore, all of Calif.

[73] Assignee: The Regents of The University of California, Oakland, Calif.

[21] Appl. No.: 58,900

[22] Filed: May 4, 1993

[51] Int. Cl.⁶ .............................................. E02D 3/11
[52] U.S. Cl. .................................... 405/128; 405/131; 166/272; 166/302; 166/303; 166/306
[58] Field of Search ........................... 405/128–131; 166/272, 302, 303, 306

[56] References Cited

U.S. PATENT DOCUMENTS

| | | | |
|---|---|---|---|
| 4,956,535 | 9/1990 | Buelt et al. | 405/131 X |
| 5,011,329 | 4/1991 | Nelson et al. | 405/128 |
| 5,018,576 | 5/1991 | Udell et al. | 405/131 X |
| 5,076,727 | 12/1991 | Johnson et al. | 405/128 |
| 5,249,888 | 10/1993 | Braithwaite et al. | 405/128 |

FOREIGN PATENT DOCUMENTS

| | | | |
|---|---|---|---|
| 397611 | 1/1974 | U.S.S.R. | 405/131 |
| 759668 | 9/1980 | U.S.S.R. | 405/131 |
| 1137155 | 1/1985 | U.S.S.R. | 405/131 |
| 1430460 | 10/1988 | U.S.S.R. | 405/131 |
| 1460118 | 2/1989 | U.S.S.R. | 405/131 |
| 1491959 | 7/1989 | U.S.S.R. | 405/131 |
| 1530667 | 12/1989 | U.S.S.R. | 405/131 |

*Primary Examiner*—Randolph A. Reese
*Assistant Examiner*—John A. Ricci
*Attorney, Agent, or Firm*—Henry P. Sartorio; Daryl S. Grzybicki

[57] ABSTRACT

A dynamic underground stripping process removes localized underground volatile organic compounds from heterogeneous soils and rock in a relatively short time. This method uses steam injection and electrical resistance heating to heat the contaminated underground area to increase the vapor pressure of the contaminants, thus speeding the process of contaminant removal and making the removal more complete. The injected steam passes through the more permeable sediments, distilling the organic contaminants, which are pumped to the surface. Large electrical currents are also applied to the contaminated area, which heat the impermeable subsurface layers that the steam has not penetrated. The condensed and vaporized contaminants are withdrawn by liquid pumping and vacuum extraction. The steam injection and electrical heating steps are repeated as necessary. Geophysical imaging methods can be used to map the boundary between the hot, dry, contamination-free underground zone and the cool, damp surrounding areas to help monitor the dynamic stripping process.

19 Claims, 3 Drawing Sheets

DYNAMIC UNDERGROUND STRIPPING: STEAM AND ELECTRIC HEATING FOR IN SITU DECONTAMINATION OF SOILS AND GROUNDWATER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the removal of subsurface contaminants using underground heating by steam injection and application of electric currents. In particular, the invention is a method for removing volatile organic contaminants from heterogeneous soils and rock by vacuum extraction and pumping of fluids heated by steam and electric currents.

2. Description of Related Art

Concentrated underground organic contaminant plumes, such as from a leaking underground storage tank, are one of the most prevalent groundwater contamination sources. If the stored liquid escapes from the tank slowly, the operator may not become aware of the problem for years. By that time, the solvent or fuel can percolate deep into the earth, penetrating permeable layers of sand and gravel and relatively impermeable clays, and often migrating to water-bearing regions.

These contaminants collect underground as a separate, liquid organic phase called non-aqueous-phase liquids (NAPLs) and continually compromise the surrounding groundwater. This type of spill is one of the most difficult environmental problems to remediate. Removing the contaminants by pumping the groundwater requires a huge amount of water to be washed through the contaminated area and can take decades. This method has been used at some sites, and although pumping over many years resulted in clean effluent water, the groundwater became contaminated again when the pumps were shut off and restarted years later.

Another method of remediation is to heat the subsurface to vaporize the underground contaminants, and then remove them by vacuum extraction. Many methods have been proposed for underground heating. The principal technology is steam injection coupled with vacuum extraction, which was developed at the University of California, Berkeley. (See U.S. Pat. No. 5,018,576 by Udell et al.) This technique provides an efficient way to heat the subsurface, as well as a controllable sweeping mechanism to move and extract the contaminants. The major disadvantage of steam injection is that the steam does not penetrate clay or other low permeability layers well, leaving significant areas of the contaminated plume untreated. An additional mechanism is required to dry and clean the impermeable layers that are common in the soils of the western United States.

A method is needed that can be applied to heterogeneous soil and rock layers, which have highly variable fluid and gas permeabilities. In a heterogeneous site, the more permeable clay-rich units are generally more electrically conductive than the hydrologically permeable units, which are penetrated by the steam. This invention proposes to combine steam injection with another technique that can reach the areas impermeable to steam and thereby uniformly heat the entire contaminated area.

The most efficient and controllable method for heating clay or other low permeability layers on a large scale is direct electrical resistance heating. The clay layers act as the heating element when large electric currents are driven through them. The electrical resistance heating targets the clay-rich layers that are not well-penetrated by steam injection. Electric heating is self-limiting, in that the electric current will stop flowing as the clays heat up and dry out.

SUMMARY OF THE INVENTION

The present invention is a process for removing localized underground contamination of volatile organic compounds by heating a contaminated area using steam injection and electric currents to vaporize the contaminants, and then removing the migrating subsurface fluids and vapor by vacuum extraction and liquid pumping. This method is accomplished by a system of injection and extraction wells constructed within or around the periphery of the contaminated area. Some of these wells may be equipped with electrode assemblies near the impermeable subsurface layers for delivering electrical current to these layers. The injection wells may inject steam, electricity, or both in one or more stratigraphic layers. The electrical heating electrode system is not limited to being underground, but could also be located at the surface. The arrangement or pattern of the injection and extraction wells is determined by the unique properties of the contaminant area and surrounding site.

In the present method, the extraction well is pumped to remove fluids from the surrounding area and establish a pressure gradient. Steam is injected through the injection wells into the subsurface layers, raising the temperature of the sediments to the boiling point of water. A steam front moves toward the extraction well, vaporizing the volatile organic contaminants in the layers along its path. The condensed and vaporized fluids are removed by liquid pumping and vacuum extraction from the extraction well.

An electric current is applied to the electrode assemblies, which heats the layers that are less permeable to steam and vaporizes the organic contaminants contained within. These contaminants migrate down the pressure gradient toward the extraction well and to other more permeable layers that are accessible by steam. The contaminants are again removed by liquid pumping and vacuum extraction. The steam injection and electrical resistance heating processes are typically alternated and repeated at least once. However, the phasing and duration of steam injection and electrical heating are chosen to address the particular heterogeneities of the site.

The complementary methods of electrical heating and steam injection can heat large blocks of earth, fifty yards on a side, while providing controlled removal of the contaminant and associated groundwater. The combined processes are more efficient, since hydrologically-conductive and electrically-conductive zones are often mutually exclusive.

DETAILED DESCRIPTION OF THE INVENTION

Figure 1:
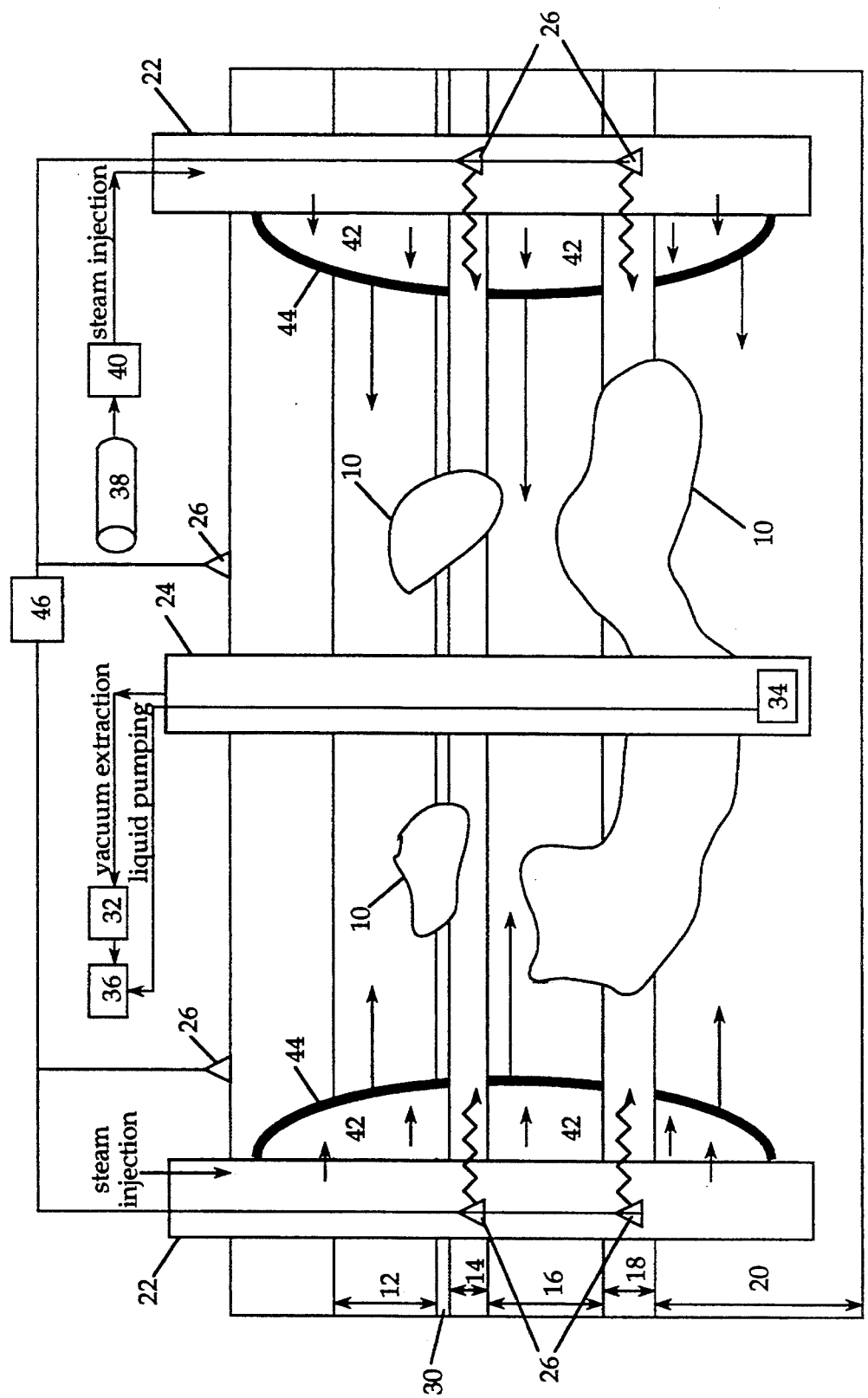
FIG. 1 is a schematic diagram of a cross-section of the subsurface, showing the process of dynamic underground stripping.

The present invention is a method of dynamic underground stripping, which removes underground contaminants using electrical resistance heating and steam injection. The method is shown schematically in FIG. 1, which shows a cross-section of the subsurface. The method was developed primarily for removing organic compounds, but is suitable for other types of liquid contaminants.

In a typical application, concentrated plumes or areas 10 of contaminants are present in subsurface layers 12,16,20 that are hydrologically permeable to steam and also in relatively impermeable layers 14,18. A system of injection wells 22 is vertically disposed around the periphery of or within the contaminated areas 10. The injection wells 22 are designed to inject steam into the adjacent sediments and should extend at least as deep as the contaminated plumes 10.

One or more extraction wells 24 (or recovery wells) are sunk near or within the contaminated zones 10 and spaced apart from the injection wells 22. The extraction well 24 is vertically disposed in or around the contaminated areas 10 and is designed to remove liquids, vapors, and gases by liquid pumping and by application of subatmospheric pressure, i.e., vacuum extraction. The extraction well 24 should extend below the depth at which the deepest penetration of contamination is suspected.

Figure 2A:
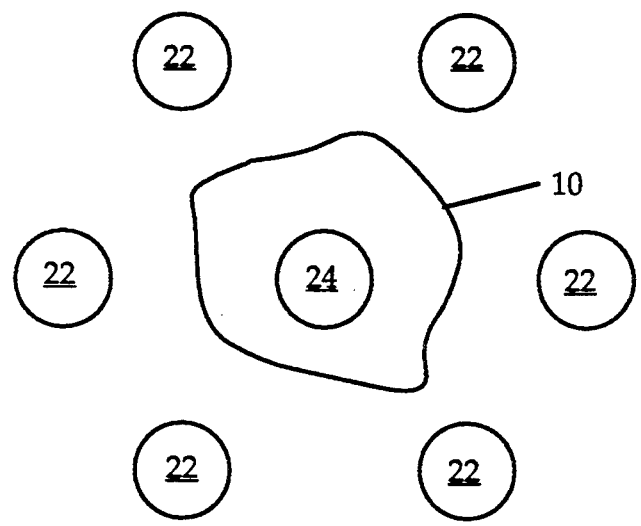
FIGS. 2A-2C are plan views of patterns of injection and extraction wells relative to a contaminated zone.
Figure 2B:
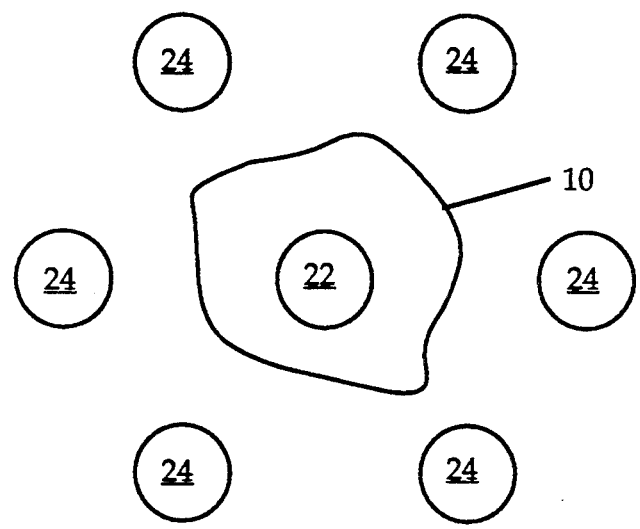
Figure 2C:
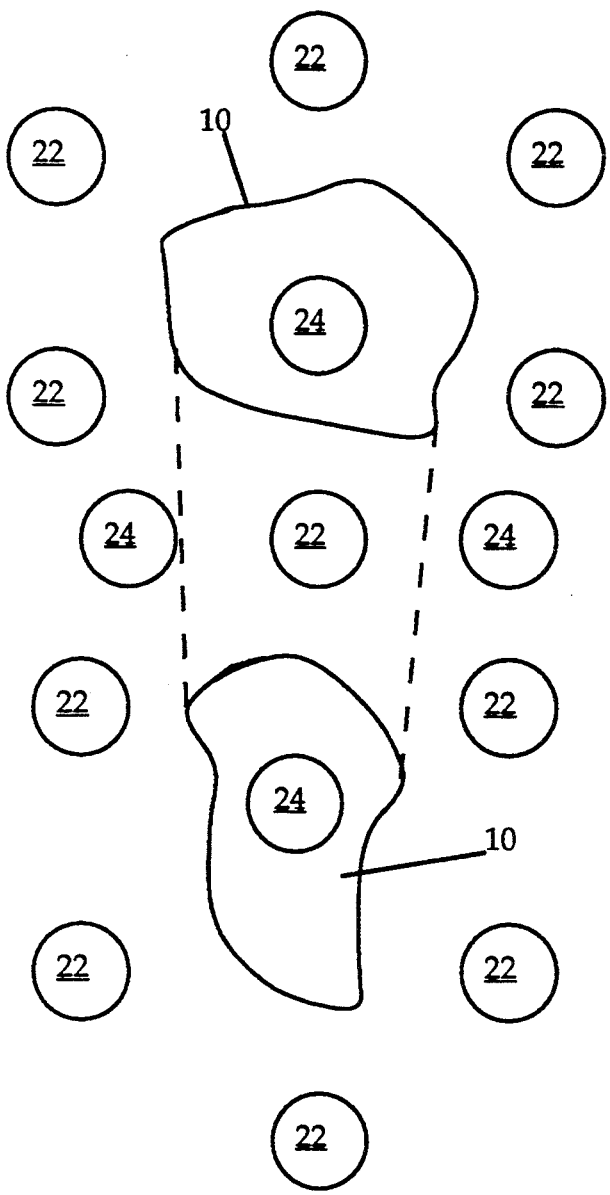

The system of extraction wells 24 and injection wells 22 form a pattern that is adapted to the stratigraphy of the contaminated site and the characteristics of the contaminated plumes. FIG. 2A shows a plan view of a typical pattern of injection wells 22 surrounding an extraction well 24 in the center of a contaminated zone 10. Alternatively, extraction wells 24 can be placed around the periphery of the contaminated zone 10, with an injection well 22 located within the zone 10, as shown in FIG. 2B. Another pattern of wells 22,24 for a single large area or multiple contamination areas 10 is illustrated in FIG. 2C. The pattern can be changed easily on site, because the function of the injection and extraction wells can be reversed one or more times by switching the means on the wells for steam injection and extraction.

An electrical resistance heating system comprising strategically placed electrode assemblies 26 is constructed on or below the surface. The electrodes 26 may form a surface array, or be located in the steam injection wells 22, the extraction wells 24, or in wells dedicated to injecting electrical currents. Typically, an assembly 26 is formed of conductive packing material and a stainless steel electrode, which is placed in an injection well 22.

In order to target high conductivity layers for electrical resistance heating, the electrodes 26 are positioned next to less permeable, fine-grained layers 14,18. The steam injection wells 22 are fitted with screens next to subsurface layers 12,16,20 that are more permeable. Electric currents heat the subsurface by ohmic dissipation of energy as the current flows through the conductive ground. The distribution of energy deposited in the ground is controlled by the resistivity distribution and electrode replacement.

The remediation process may begin with liquid pumping of the extraction well (or wells) 24 and pumping at a subatmospheric pressure ($\leq 15$ psi), typically a vacuum. This pumping depresses the water table 30 and removes residual liquids and gases trapped in the pores and channels of the sediments. The negative pressure is maintained on each extraction well 24 by a vacuum pump 32, and the extracted fluids may be pumped via a down-hole liquid pump 34 to an effluent treatment system 36, which also receives the output of the vacuum pump 32.

Saturated steam is delivered to the injection wells 22, supplied by a boiler 38 through a distribution and pressure regulating system 40. The steam 42 flows from the sides of the injection wells 22, passing through the contaminated plumes 10 toward the low pressure extraction well 24. The injection pressure is controlled by depth and is lower for shallow applications. The amount of heat needed to bring the ground to 100° C. (or to vaporize the subsurface fluids) is the principal control on how much steam must be injected. The pressure and steam delivery rates affect the rate at which the contaminated field can be heated and the shape of the advancing steam front. The steam pressure is typically about 2 psi/ft depth, and commonly is 50 to 70 psi. The applicants have demonstrated that a 32 MBtu boiler can be used to heat an underground volume of about 60,000 yd$^3$.

As steam 42 is forced into the subsurface, the earth is heated to the boiling point of water (at the applied pressure). The advancing pressure front 44 of steam displaces the groundwater, pushing the groundwater or condensate toward the extraction well 24. On the steam side 42 of the steam-groundwater front 44, the volatile compounds in the accessible subsurface layers 12,16,20 are distilled into the vapor phase, transported to the steam-groundwater interface 44, and condensed there.

The advancing steam zone 44 displaces the condensed liquids, which move toward the recovery well 24 where they are pumped to the surface by liquid pumping. The gases and vapors are extracted by vacuum extraction. The steam front 44 travels in all directions (360°) from the injection well, but is only shown moving toward the extraction well 24 for simplicity in FIG. 1. The steam front 44 should be forced through the contaminated area quickly, to minimize steam channeling through the sediments and by-passing pockets of contamination.

The injection of steam typically continues until steam breakthrough to the extraction well 24. When the steam front 44 reaches the extraction well 24, most of the groundwater in the area has been pumped out or vaporized. Vacuum extraction then becomes the most important removal mechanism to withdraw vapor and gas. The steam input is stopped, and a subsequent drop in the steam zone pressure creates a partial vacuum underground, which slightly reduces the boiling point of any residual water or contaminants held by capillary forces, and forces the liquids to boil and convert to removable vapor. The applicants have demonstrated that the initial ground temperature can be raised above 115° C. The liquid pumping and vacuum extraction processes continue to withdraw contaminated liquids, vapors, and gases from the subsurface even though the steam injection process has ceased.

At this point in the process, not all of the contaminated sediments may have been penetrated by the steam. The electrode assemblies 26 of the electrical heating system are turned on, passing large currents generated by a portable electric generator or transformer 46. This electrical current heats the clay and fine-grained sediments, which causes the trapped water and contaminants to vaporize and be forced toward the low pressure extraction well 24 for removal by vacuum extraction and liquid pumping, or forced into a layer accessible by a steam zone. The electrodes 26 are typically placed in or near the impermeable layers 14,18 and typically pass standard single or 3-phase current up to 600 V. The applicants have demonstrated that an underground volume of 20,000 yd$^3$ can be heated using about 1 MW of power or about 1 kW hour/°C./yd$^3$.

The electrical heating may be followed by one or more steam injection phases or episodes to remove residual contaminants and to keep the permeable zones hot as the groundwater returns. Cycles of steam injection and electrical heating with vacuum extraction and liquid pumping may be repeated as necessary. The electrical heating and steam injection steps may be reversed, so the ground is first heated by electrical currents, and then treated with steam injection. Typically, the site is pre-heated with electrical currents before any injection of steam to increase the electrical conductivity contrast between the impermeable and permeable layers.

Steam injection and electrical heating processes are typically carried out alternately, but may be performed simultaneously. For example, the electrical heating may be run continuously, with intermittent episodes of steam injection. However, running the two steps concurrently is not recommended because of the electrical hazard and the manned operation of the boiler.

The extracted liquids and gases may be analyzed to determine the point at which further application of steam or electrical heating is no longer worthwhile. The steam injection and electrical heating processes are typically carried out for many days or weeks, but optimal phasing and duration of the heating and extraction steps are dependent on the size, lithography, and stratigraphy of a particular site.

The present dynamic underground stripping technique uses large amounts of added thermal energy to speed the contaminant removal process. Real-time monitoring is necessary for process control and to ensure that contaminants are not inadvertently moved to an uncontaminated area. Real-time monitoring provides actual images of the underground processes, so that underground regions that have and have not been affected by the stripping process can be identified.

The goal of the combined processes is to achieve a hot, dry, contaminant-free volume of earth. This creates a large contrast for geophysical imaging techniques to use in observing the areas that have and have not been heated. Among the methods used are electrical resistance tomography (ERT), seismic tomography, induction tomography, passive seismic monitoring, temperature measurements, tiltmeter surveys, and conventional geophysical well logging in dedicated monitoring boreholes. These monitoring and profiling techniques provide valuable information that permits the operators to adjust operating parameters, such as steam injection pressure or electrode configuration, to address subsurface zones that have not been heated effectively.

The foregoing description of preferred embodiments of the invention is presented for purposes of illustration and description and is not intended to be exhaustive or to limit the invention to the precise form disclosed. Many modifications and variations are possible in light of the above teaching.

We claim:

1. A method for removing volatile subsurface contaminants from one or more layers of the earth's subsurface, comprising:
    (a) constructing an injection well system, comprising one or more injection wells proximate to or within an area of subsurface contaminants, wherein at least one injection well comprises means for injecting steam into the subsurface;
    (b) constructing an electrical heating system for applying electric currents to the subsurface layers;
    (c) constructing at least one extraction well proximate to or within the contaminated area and spaced apart from the injection wells, wherein the extraction well comprises means for removing liquids, vapors, and gases from the subsurface;
    (d) injecting steam and applying electric currents into the subsurface through the injection wells and the electrical heating system, whereby the steam and electric currents heat the subsurface and vaporize the contaminants, which are drawn through the subsurface to the extraction well; and
    (e) extracting the contaminants from the extraction well by applying subatmospheric pressure to remove gases and vapors and by pumping the liquids concurrent with the steam injection and application of electric currents.

2. The method as recited in claim 1, wherein step (b) comprises: positioning at least one electrode assembly on the surface of the earth.

3. The method as recited in claim 1, wherein step (b) comprises: positioning at least one electrode assembly in one or more of the injection wells.

4. The method as recited in claim 3, wherein the electrodes are positioned near impermeable layers of the subsurface.

5. The method as recited in claim 1, wherein step (b) comprises: positioning at least one electrode assembly in one or more of the extraction wells.

6. The method as recited in claim 1, wherein step (b) comprises: positioning at least one electrode assembly in a well dedicated to electrical heating.

7. The method as recited in claim 1, further comprising: performing vacuum extraction to remove gases and vapors and pumping liquids from the extraction well before any steam injection or application of electric currents in step (d).

8. The method as recited in claim 1, further comprising: preheating the subsurface using electric currents.

9. The method as recited in claim 1, wherein step (d) comprises:
    (1) first injecting steam into the subsurface through the injection wells;
    (2) ceasing the steam injection; and
    (3) applying electric currents to the subsurface through the electrical heating system.

10. The method as recited in claim 9, further comprising:
    (4) repeating steps (1) to (3) at least once.

11. The method as recited in claim 1, wherein step (d) comprises:
    (1) first applying electric currents to the subsurface through the electrical heating system;
    (2) ceasing the electrical heating; and
    (3) injecting steam into the subsurface through the injection wells.

12. The method as recited in claim 11, further comprising:
(4) repeating steps (1) to (3) at least once.

13. The method as recited in claim 1, wherein step (d) comprises:
simultaneously injecting steam and applying electric currents into the subsurface.

14. The method as recited in claim 1, wherein the application of electric currents in step (d) comprises:
applying electric currents to subsurface layers that are impermeable to steam injection.

15. The method as recited in claim 1, wherein step (d) comprises:
(1) injecting steam in one or more episodes of selected duration; and
(2) continuously applying electric currents throughout and between the steam injection episodes.

16. The method as recited in claim 1, wherein the function of at least one injection well can be reversed one or more times to function as an extraction well.

17. A method for removing volatile organic subsurface contaminants from one or more layers of the earth's subsurface, comprising the steps:
(a) constructing an injection well system, comprising one or more injection wells proximate to or within an area of subsurface contaminants, wherein at least one injection well comprises means for injecting steam into the subsurface, and wherein at least one well comprises means for applying electrical current into the subsurface;
(b) constructing at least one extraction well proximate to or within the contaminated area and spaced apart from the injection wells, wherein the extraction well comprises means for removing liquids, vapors, and gases from the subsurface;
(c) injecting steam and applying electrical currents into the subsurface through the injection wells, whereby the steam and electrical currents heat the subsurface and vaporize the contaminants, which are drawn through the subsurface to the extraction well; and
(d) concurrently extracting the contaminants from the extraction well by applying subatmospheric pressure to remove gases and vapors and pumping the liquids.

18. The method as recited in claim 17, wherein at least one extraction well is constructed within the contaminated area, and at least one injection well is constructed outside the contaminated area.

19. The method as recited in claim 17, wherein at least one injection well is constructed within the contaminated area, and at least one extraction well is constructed outside the contaminated area.

* * * * *